Patented Sept. 29, 1925.

1,555,474

UNITED STATES PATENT OFFICE.

LEWIS D. MATHIAS, OF CHICAGO HEIGHTS, ILLINOIS, ASSIGNOR TO VICTOR CHEMICAL WORKS, A CORPORATION OF ILLINOIS.

CHLORINE-CONTAINING COMPOUND.

No Drawing. Application filed June 23, 1924. Serial No. 721,934.

*To all whom it may concern:*

Be it known that I, LEWIS D. MATHIAS, a citizen of the United States, residing at Chicago Heights, in the county of Cook and State of Illinois, have invented a new and useful Improvement in Chlorine-Containing Compounds, of which the following is a specification.

This invention relates to improvements in compounds containing chlorine in an available form primarily intended for use for germicidal and disinfectant purposes.

In accordance with the present invention, a material containing available chlorine is produced in a form of a compound, hitherto unknown, having the character of a double salt of normal sodium phosphate and hypochlorite, the proportion of available chlorine being at least 1% by weight.

In carrying out the process of my invention, I may react upon a solution of a sodium phosphate salt with a hypochlorite in the presence of sufficient caustic alkali to insure the presence of the normal phosphate salt. Thus, I may use the normal sodium phosphate or an acid sodium phosphate or even phosphoric acid together with sufficient caustic alkali (as sodium hydroxide, for example) to form the normal salt and provide at least a slight excess of alkali. The hypochlorite may be added as such, or may be formed in the reaction mixture by providing a sufficient excess of sodium hydroxide therein and passing chlorine into it. The following examples illustrate various methods in which my invention may be carried into effect.

1. Trisodium phosphate ($Na_3PO_4.12 H_2O$) is dissolved in sufficient water to form a saturated solution at the temperature at which the reaction is carried out, which should be at least 15° C. and should preferably be about 50° C. 2% or higher (preferably from 2 to 10%) (on the phosphate) of sodium hydroxide is added to the solution and chlorine is passed thereinto slowly until from 5 to 10% or higher (on the phosphate) of available chlorine has been added, the temperature being maintained about 15° C., and preferably about 50° C. More than 10% of the alkali may be employed, but too great an excess unfavorably affects the economy and yields of the operation. Excessive proportions of chlorine have similar unfavorable results. The reaction mixture is then cooled slowly and colorless crystals of the double salt of the phosphate and hypochlorite settle out. The composition of these crystals has not been precisely determined. Their weight varies from 55 to 100% of the weight of phosphate originally employed and their available chlorine content from 1.25 to 3%. By using saturated solutions of sodium phosphate containing 10 to 20% of sodium hydroxide and passing chlorine through the solution until a test of the liquor showed the presence of free chlorine, on subsequent crystallization crystals containing from 2.5 to 4% of available chlorine were obtained.

2. On mixing concentrated solutions of an acid sodium phosphate, such as the disodium phosphate, sodium hydroxide and sodium hypochlorite at temperatures above 15° C., crystals of the double salt are likewise obtained. Thus, by mixing a saturated solution of crystalline disodium phosphate with a solution of sodium hydroxide sufficient to provide 10 to 12% of sodium hydroxide on the disodium phosphate, and sufficient saturated solution of sodium hypochlorite to provide 5 to 10% of available chlorine by weight based on weight of disodium phosphate and crystallizing the resulting mixture, crystals of the double salt were obtained, containing from 2 to 4% of available chlorine. Less concentrated solutions may be employed, if desired; for example, the "disoda liquor" obtained in the manufacture of disodium phosphate may be employed.

In the various methods of operating in accordance with this invention, a considerable proportion of the available sodium phosphate remains in the mother liquor, from two-thirds to three-fourths being precipitated in the form of the double salt. The mother liquor also contains a considerable proportion (from 40 to 60%) of the chlorine used in carrying out the reaction. It has been found that this mother liquor may be made use of by adding thereto sufficient sodium phosphate or acid sodium phosphate (as disodium phosphate), alkali (for example, sodium hydroxide) and chlorine, either as chlorine or sodium hypochlorite to restore the conditions originally prevailing in the solution before precipitation or crystallization of the double salt, the temperature being brought to above 15° C., say about 50° C., while this is being done. On cooling a further crystallization takes place.

In each case the double salt is a colorless, crystalline substance, readily soluble and containing 1% or more available chlorine.

The mother liquor remaining after removal of the crystals may also be employed in diluting the reaction mixture when the reaction is carried out with more dilute solutions, as in the following example:

3. Disoda liquor, containing disodium phosphate having a Baumé gravity of 32 to 40° is used. Caustic soda solution (40° Baumé) is added in quantities sufficient to make up the calculated amount necessary for forming the trisodium phosphate and providing a slight excess, and sodium hypochlorite solution (say 33° Baumé) is then added in amount sufficient to give approximately two to two and one-half times the percentage of chlorine desired in the double salt product. Thus, if a product containing 3% available chlorine is desired, the hypochlorite supplied should be calculated on the basis of 6 to 7½% available chlorine on the weight of crystalline disodium phosphate in solution. Water or mother liquor from a preceding finished batch (as hereinafter set forth) is then added to bring the solution to a Baumé gravity of approximately 26° at 50° C. before adding the hypochlorite to the solution. The mixture is allowed to cool to, say, 20 to 23° C. slowly and the crystalline double salt separated out is removed. The mother liquor, which has a Baumé gravity of 13 to 14° may be separately worked up, the proper proportions of phosphate, alkali and chlorine being supplied therein, or may be used to dilute the next batch of disodium phosphate liquor and alkali treated before the hypochlorite solution is added thereto.

I claim:

1. A compound of a normal phosphate and a hypochlorite of sodium, having at least 1% of available chlorine.

2. A compound of a normal phosphate and a hypochlorite of sodium having 3% of available chlorine.

3. The method of forming a compound containing available chlorine comprising providing in an aqueous solution normal sodium phosphate and an alkali metal hypochlorite, the temperature being in excess of 15° C., and separating the resulting compound by crystallization.

4. The method of providing a compound containing available chlorine comprising the steps of adding to a concentrated solution of a normal sodium phosphate a solution of an alkali metal hypochlorite and separating the resulting compound.

5. The method of forming a compound containing available chlorine comprising adding soluble alkali to a concentrated solution of a normal sodium phosphate at a temperature above 15° C., and passing chlorine through the solution.

6. The method of forming a compound containing available chlorine which comprises maintaining a saturated solution of normal sodium phosphate at 50° C., providing sodium hypochlorite in the solution, and cooling the liquor to crystallize out the desired compound.

7. The method of forming a compound containing available chlorine comprising introducing into a solution of normal sodium phosphate a solution of an alkali metal hypochlorite.

8. The method of forming a compound containing available chlorine which comprises adding to a solution of disodium phosphate sufficient soluble alkali to form the normal phosphate, and adding to the resulting solution a concentrated solution of sodium hypochlorite.

9. The method of forming a material combining sodium phosphate and sodium hypochlorite which comprises adding to a solution of disodium phosphate sufficient sodium hydroxide solution to form the normal phosphate, and adding a sodium hypochlorite solution to the resulting solution.

10. The method of forming a material combining sodium phosphate and sodium hypochlorite which comprises adding to a concentrated disodium phosphate solution sufficient sodium hydroxide solution to form the trisodium phosphate, diluting the solution to 26° Baumé while maintaining it at 50° C. and adding thereto an alkali metal hypochlorite solution.

11. The method of forming a material combining sodium phosphate and sodium hypochlorite which comprises adding to a concentrated disodium phosphate solution sufficient sodium hydroxide solution to form the trisodium phosphate, diluting the solution to 26° Baumé while maintaining it at 50° C. and adding thereto an alkali metal hypochlorite solution, cooling the resulting solution, thereby crystallizing out the compound, and employing the mother liquor to dilute a succeeding batch undergoing treatment.

LEWIS D. MATHIAS.